(12) United States Patent
Buergy et al.

(10) Patent No.: US 11,506,334 B2
(45) Date of Patent: Nov. 22, 2022

(54) LUBRICATION DISTRIBUTION ASSEMBLY

(71) Applicants: SKF Lubrication Systems Germany GmbH, Walldorf (DE); IFM Electronic GmbH, Essen (DE)

(72) Inventors: Armin Buergy, Brühl (DE); Armin Guenther, Helmstadt-Bargen (DE); Jörg Poser, Wasserburg (DE); Stefan Schuermann, Walldorf (DE); Gunther Wenskat, Otterberg (DE)

(73) Assignees: SKF LUBRICATION SYSTEMS GERMANY GMBH, Walldorf (DE); IFM ELECTRONIC GMBH, Essen (DE)

( * ) Notice: Subject to any disclaimer, the term of this patent is extended or adjusted under 35 U.S.C. 154(b) by 784 days.

(21) Appl. No.: 16/266,728

(22) Filed: Feb. 4, 2019

(65) Prior Publication Data

US 2019/0249826 A1 Aug. 15, 2019

(30) Foreign Application Priority Data

Jan. 26, 2018 (DE) .......................... 102018101772.3

(51) Int. Cl.
*F16N 13/04* (2006.01)

(52) U.S. Cl.
CPC .......... *F16N 13/04* (2013.01); *F16N 2250/00* (2013.01); *F16N 2270/26* (2013.01)

(58) Field of Classification Search
CPC ...... F16N 13/04; F16N 2250/00; F16N 25/00; F16N 29/02
See application file for complete search history.

(56) References Cited

U.S. PATENT DOCUMENTS

| | | | |
|---|---|---|---|
| 3,422,926 A | 1/1969 | Stanaway | |
| 4,571,939 A * | 2/1986 | Dollison | F03C 1/10 60/372 |
| 4,693,171 A * | 9/1987 | Dollison | F04B 47/04 91/216 B |
| 4,696,221 A * | 9/1987 | Dollison | F04B 47/04 137/624.13 |
| 6,053,285 A * | 4/2000 | Reeves | F16N 29/00 184/6.23 |
| 6,663,348 B2 | 12/2003 | Sergio et al. | |
| 8,104,582 B2 | 1/2012 | Moilanen | |
| 10,113,693 B2 * | 10/2018 | Guenther | F16N 7/38 |
| 2010/0006056 A1 * | 1/2010 | Aamand | F16N 13/16 123/196 R |

(Continued)

FOREIGN PATENT DOCUMENTS

| | | |
|---|---|---|
| CN | 1434901 A | 8/2003 |
| CN | 201611000 U | 10/2010 |

(Continued)

*Primary Examiner* — Michael R Mansen
*Assistant Examiner* — Mark K Buse
(74) *Attorney, Agent, or Firm* — Cantor Colburn LLP

(57) ABSTRACT

A lubrication distribution assembly is provided. The lubrication distribution assembly includes a lubrication metering device, which includes a piston. The lubrication distribution assembly also includes a sensor and a controller. The sensor automatically detects a piston stroke length of the piston over at least two movement cycles of the piston. The controller receives the piston stroke length from the sensor, sets an operating point of the piston based on the piston stroke length, and controls the lubrication metering device by utilizing the set operating point.

10 Claims, 3 Drawing Sheets

(56) References Cited

U.S. PATENT DOCUMENTS

| | | | | |
|---|---|---|---|---|
| 2012/0134847 | A1* | 5/2012 | Conley | F16N 13/02 |
| | | | | 417/15 |
| 2013/0161130 | A1* | 6/2013 | Alexander | F16N 13/04 |
| | | | | 184/32 |
| 2013/0277148 | A1* | 10/2013 | Beck | F16N 29/02 |
| | | | | 184/6.4 |
| 2015/0176762 | A1* | 6/2015 | Conley | F16N 13/06 |
| | | | | 417/43 |
| 2016/0033079 | A1* | 2/2016 | Guenther | F16N 7/38 |
| | | | | 184/7.4 |
| 2016/0208983 | A1* | 7/2016 | Moilanen | F16N 29/02 |
| 2018/0149461 | A1* | 5/2018 | Hess | F16N 13/02 |
| 2018/0202603 | A1* | 7/2018 | Guenther | F16N 25/00 |
| 2019/0249826 | A1* | 8/2019 | Buergy | F16N 13/04 |
| 2020/0088349 | A1* | 3/2020 | Kim | F16N 13/04 |
| 2020/0347989 | A1* | 11/2020 | Conley | F16N 25/02 |
| 2021/0262315 | A1* | 8/2021 | Beason | F16K 3/36 |
| 2021/0310612 | A1* | 10/2021 | Kreutzkaemper | F16N 7/00 |

FOREIGN PATENT DOCUMENTS

| | | |
|---|---|---|
| CN | 103542246 A | 1/2014 |
| CN | 106015893 A | 10/2016 |
| DE | 1625894 B1 | 7/1970 |
| DE | 3836594 A1 | 5/1990 |
| DE | 4304418 A1 | 8/1994 |
| DE | 10049505 A1 | 5/2001 |
| DE | 202004004839 U1 | 6/2004 |
| DE | 102004046107 A1 | 4/2006 |
| DE | 102006012810 A1 | 9/2006 |
| DE | 102006001317 A1 | 7/2007 |
| DE | 102007029488 A1 | 1/2009 |
| DE | 102012217452 A1 | 3/2014 |
| DE | 102013214425 A1 | 5/2014 |
| DE | 102016203902 A1 | 9/2017 |
| DE | 102016203912 A1 | 9/2017 |
| DE | 102016106213 A1 | 10/2017 |
| GB | 2055433 A | 3/1981 |

* cited by examiner

LUBRICATION DISTRIBUTION ASSEMBLY

CROSS REFERENCE TO RELATED APPLICATIONS

This application claims priority to German (DE) Application No. 102018101772.3, filed Jan. 26, 2018, which is incorporated by reference in its entirety herein.

BACKGROUND

The disclosure relates generally to a lubrication distribution assembly.

In general, lubrication systems includes lubrication metering devices that can be used for supplying lubricant to associated lubrication points of the lubrication systems. In some cases, lubrication metering devices are formed as conventional piston metering devices that, in each lubrication cycle, supply a predetermined amount of lubricant to the lubrication points by using a piston. Piston detector elements, used in these conventional piston metering devices, serve for determining a position of the piston to control the piston and a supplied amount of lubricant.

SUMMARY

According to one or more embodiments, a lubrication distribution assembly is provided. The lubrication distribution assembly includes a lubrication metering device, which includes a piston. The lubrication distribution assembly also includes a sensor and a controller. The sensor automatically detects a piston stroke length of the piston over at least two movement cycles of the piston. The controller receives the piston stroke length from the sensor, sets an operating point of the piston based on the piston stroke length, and controls the lubrication metering device by utilizing the set operating point.

According to one or more embodiments, the above lubrication distribution assembly can be implemented as a method, system, apparatus, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Turning now to an overview of technologies that are more specifically relevant to aspects of the invention, as discussed above, conventional piston metering devices supply a predetermined amount of lubricant, in each lubrication cycle, to lubrication points of a lubrication system by using a piston. Conventional piston metering devices include progressive metering devices, single line metering devices, or dual-line metering devices. For different conventional piston metering devices or other types of types of metering devices, different pistons are used, which have a cross-section and piston stroke length that is adapted to the corresponding application.

More particularly, different piston detectors are used for different conventional piston metering devices. That means that depending on the used piston metering device or lubrication metering device 201, different piston detectors are used that determine the piston stroke length, and control and set the piston metering device based thereon. Also, while the piston detectors are calibrated to each associated piston and application issue when entering field use, variations of environmental conditions (e.g., variations in temperature) may result in an alteration at the piston, such as a displacement of the piston stroke length.

Turning now to an overview of the aspects of the invention, one or more embodiments of the invention address the above-described shortcomings of the prior art by providing a lubrication distribution assembly, in which the same controller may be used for different lubrication metering devices and different environmental conditions. In this regard, a lubrication distribution assembly including a lubrication metering device having a piston, a sensor detecting a piston stroke length of the piston, and a controller receiving the piston stroke length from the sensor can be provided. The controller of the lubrication distribution assembly can further set an operating point of the piston and control the lubrication metering device by using the operating point. Note that the sensor can automatically detect the piston stroke length over at least two movement cycles of the piston, and the controller can set the operating point of the piston based on the at least two detected piston stroke lengths.

Figure 1:
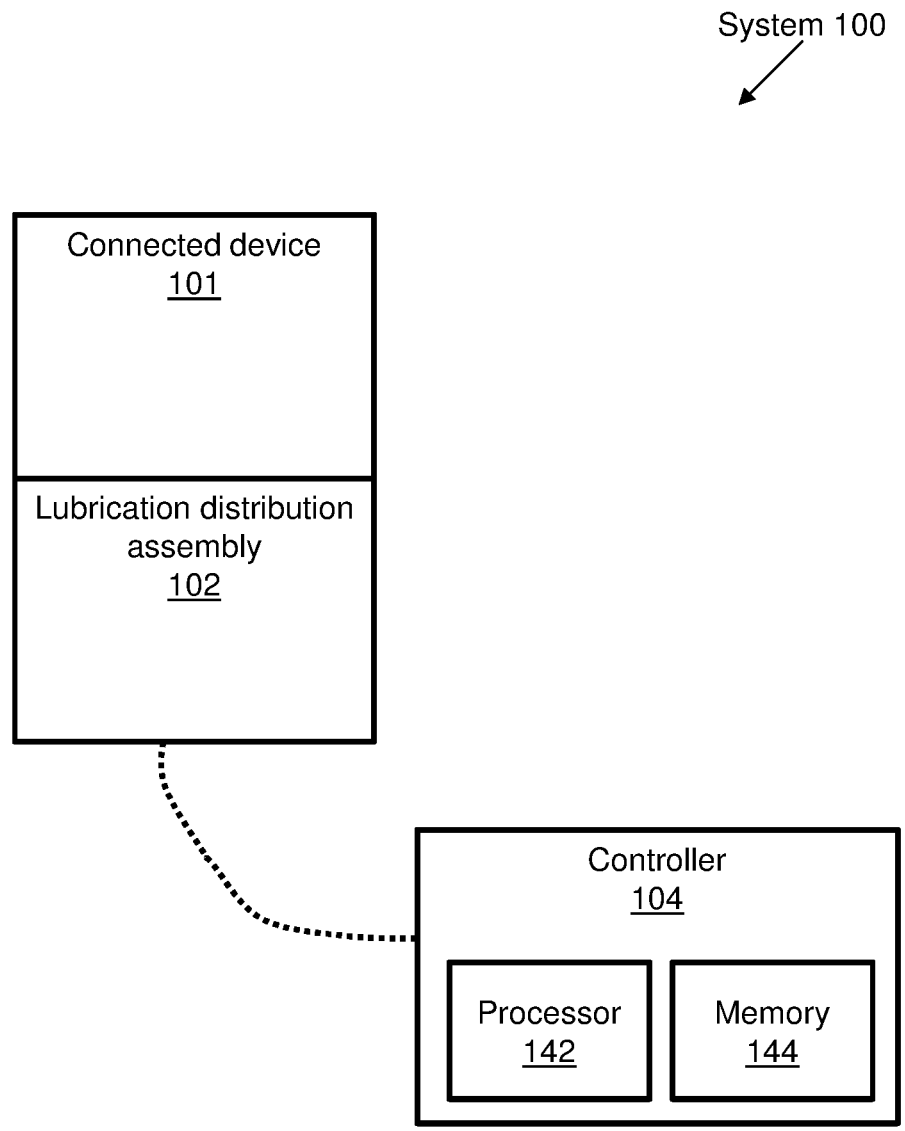
FIG. 1 depicts a system in accordance with one or more embodiments.

FIG. 1 depicts a system 100 in accordance with one or more embodiments. The system 100 includes a connected device 101, a lubrication distribution assembly 102, and a controller 104. The controller 104 includes a processor 142 and a memory 144. As shown in FIG. 1, the connected device 101 is coupled to the lubrication distribution assembly 102, such that the connected device 101 can receive lubrication material or lubricant from the lubrication distribution assembly 102 in accordance with operations of the controller 104. The lubrication distribution assembly 102 can include a lubrication metering device 201 having a piston and a sensor as described herein.

The controller 104 can be an electronic, computer framework comprising and/or employing any number and combination of computing device and networks utilizing various communication technologies, as described herein. The processing unit 104 can be easily scalable, extensible, and modular. As shown, the controller 104 comprises a processor 142, also referred to as a processing circuit, microprocessor, computing unit, and a memory 144, which includes read only memory (ROM) and random access memory (RAM), for implementing the teachings herein is shown in according to one or more embodiments of the invention. The memory 144, which is an example of a tangible storage medium readable executable by the processor 142, stores software (e.g., temperature data described herein, profiles based on the test and experiments described herein, models described herein, and the like) for execution by the processor and data (e.g., predetermined intervals, sensor readings, piston stoke lengths, etc.), which includes a set of values of qualitative or quantitative variables organized in various data structures to support and be used by operations of the software. In one or more embodiments of the present invention, the controller 104 communicates with other systems, devices, data, and software, such as sensors of the lubrication assembly. The operations of the software and the data are necessarily rooted in the computational ability of the controller 104 to overcome and address the herein-described shortcomings of the conventional piston metering devices. In this regard, the software and the data improve computational operations of the controller 104 for detecting the piston stroke length and optimizing the control of the system 100 independent of the dimensions of the lubrication distribution assembly 102 (thereby increasing efficiency of the system 100).

Figure 2:
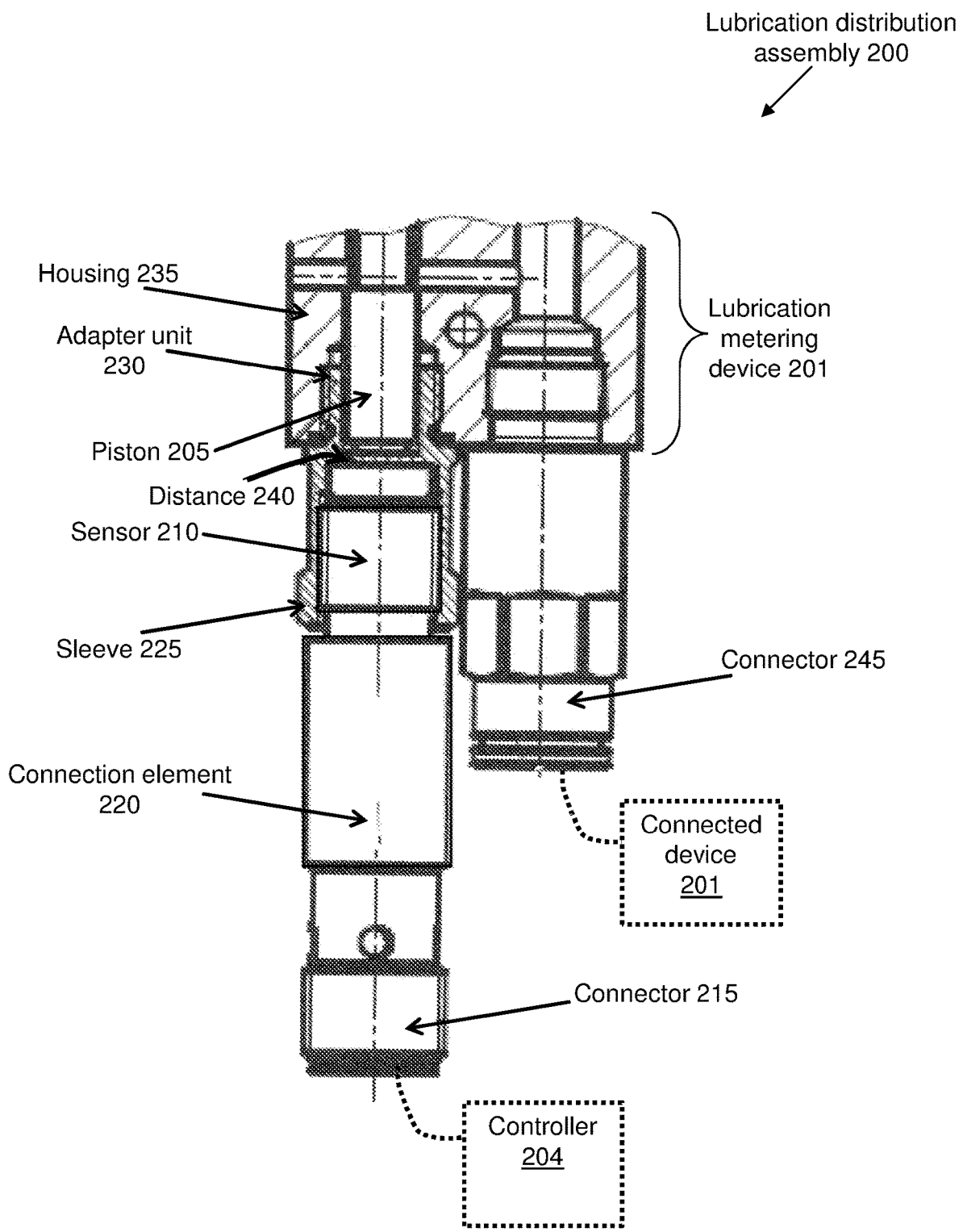
FIG. 2 depicts a cross-sectional view of a lubrication distribution assembly in accordance with one or more embodiments.

Turning now to FIG. 2, a cross-sectional view of a lubrication distribution assembly 200 is depicted in accordance with one or more embodiments. The lubrication distribution assembly 200 includes a lubrication metering device 201, a connected device 202, a controller 204, a piston 205, a sensor 210, a connector 215, a connection element 220, a sleeve 225, an adapter unit 230, a housing 235, a distance 240, and a connector 245.

The lubrication metering device 201 includes the piston 205 and is connected to the sensor 210. The sensor 210 is connected to the lubrication metering device 201 and the piston 205 by the adapter unit 230. The controller 204 via the connector 215 and the connection element 220 is in communication with (e.g., electrically coupled to) the sensor 210, the piston 205, and the lubrication metering device 201.

The sensor 210 is applicable independently of a type of the piston 205. By movement of the piston 205, the sensor 210 may determine a distance 240 between itself and the piston 205 (e.g., distance between piston 205 and sensor 210). In this regard, the sensor 210 detects a stroke length of the piston 205 (e.g., a piston stroke length). In accordance with one or more embodiments, the sensor 210 detects an extracted and retracted condition of the piston 205 based on a distance of the piston 205 to the sensor 210, where a difference between the distance in extracted condition and a distance in retracted condition is used for determining an available piston stroke length. In accordance with one or more embodiments, the sensor 210 can communicate raw distance data to the controller 204, which the controller 204 utilizes to determine the piston stroke length, or can utilize the raw distance data to determine the piston stroke length, which is then communicated to the controller 204 and used for setting the operating point.

The sensor 210 can be a proximity switch. Examples of the sensor 210 include, but are not limited to, an inductive sensor, a capacitive sensor, a magnetic field sensor, such as a Hall sensor, and any other sensor type that enables monitoring of the piston stroke length. In accordance with one of more embodiments, the proximity switch is arranged at the lubrication metering device 201, such that a movement of the piston 205 is detected without contact. Based on a movement of the piston 205, i.e., a minimum distance and a maximum distance to the sensor 210 during one piston stroke, the controller 204 determines the piston stroke length. Subsequently, the controller 204 controls the lubrication metering device 201 by the determined piston stroke length (e.g., moves the piston 205). Due to movement of the piston 205, lubrication material or lubricant, which is contained in the lubrication metering device 201, can be supplied to one or more connected devices 202 (as depicted by the connector 245).

In accordance with one or more embodiments, to perform this controlling, the controller 204 receives information on the piston 205. For instance, the controller 204 receives the piston stroke length from the sensor 210. The controller 204 of the lubrication distribution assembly 200 can further set an operating point of the piston 205 and control the lubrication metering device 201 by using the operating point. Note that the sensor 210 can automatically detect the piston stroke length over at least two movement cycles of the piston 205, and the controller 204 can set the operating point of the piston 205 based on the at least two detected piston stroke lengths.

The controller 205 can receive raw distance data from the sensor 210, which the controller 204 utilizes to determine the piston stroke length, or receive the piston stroke length from the sensor 210, which is then utilizes to set the operating point. For example, based on the detected piston stroke length, the controller 204 may set the operating point of the piston 205 and subsequently control the lubrication metering device 201. Due to the automatic determination of the piston stroke length by the sensor 210, the controller 204 can correctly control the lubrication metering device 201, even after an exchange of the piston 205 or during variations of environmental conditions, which can result in variations of the available piston stroke length.

According to one or more embodiments, the controller 204 is sets and adjusts the operating point in predefined intervals. These predetermined intervals may be similar to intervals utilized by the sensor 210 for the detection of the piston stroke length. The setting of the operating point can also be performed within intervals different to the detection of the piston stroke length. For example, the controller 204 can set the operating point if the sensor 210 has detected a variation of the piston stroke length.

According to one or more embodiments, the controller 204 averages the detected piston stroke lengths for setting the operating point of the piston 205. The controller 204 can then average the detected piston stroke lengths of at least two movement cycles. For example, of at least three movement cycles. Based on the averaged piston stroke lengths, the operating point of the piston 205 can be set. In case where the deviations between the single movement cycles are large, the number of averaged movement cycles can be increased. The deviations can be a better balanced by a higher number of considered movement cycles.

According to one or more embodiments, the controller 204 sets the operating point to a predefined portion of the detected piston stroke length. For example, the controller 204 can set the operating point to one third of the total piston stroke length. During detection of the piston stroke length, the sensor 210 can detect a minimum distance to the sensor 210 (e.g., fully extracted position of the piston 205), and a maximum distance to the sensor 210 (e.g., fully retracted position of the piston 206) and can then calculate the optimal operating point or shift point of the piston based thereon.

In addition, the adapter unit 230 and the sensor 210 may be arranged in a sleeve 225. The sleeve 225 can be installed into a housing 235 of the lubrication metering device 201. Via the sleeve 225, the sensor 210 may be exchanged or swapped out for a new or alternative sensor, easily.

In accordance with one or more embodiments, due to the lubrication distribution assembly 200 configuration, the controller 204 can easily set the operating point of the piston 205 and control the lubrication metering device 201 based thereon. Further, based on the sensor 210, the piston stroke length can be continually monitored by the controller 204 and, if required, the operating point can be re-adjusted.

Thereby, a reliable control of the piston 205 is possible even during variations in environmental conditions, such as fluctuations in temperature.

Figure 3:
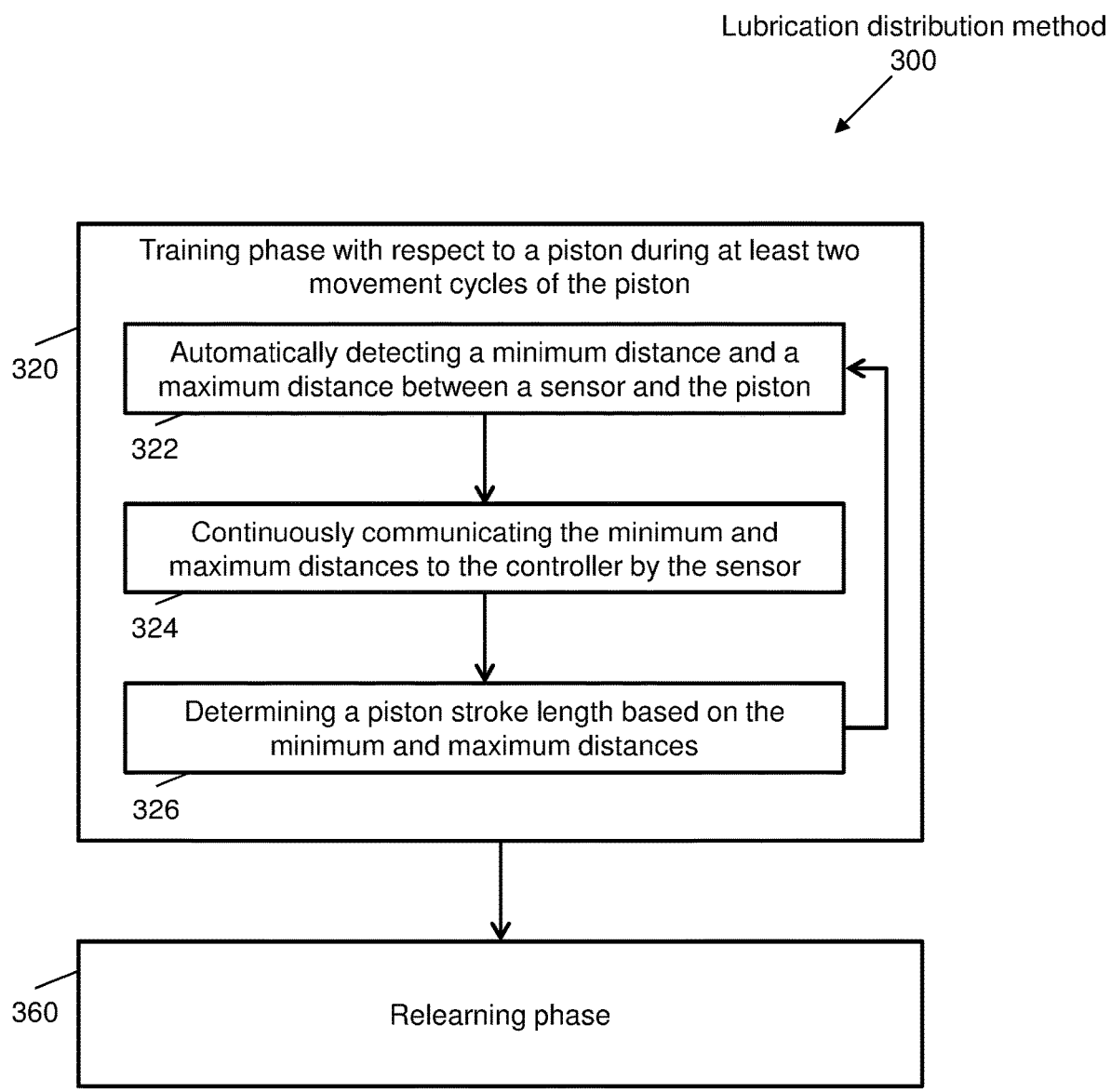
FIG. 3 depicts a lubrication distribution method in accordance with one or more embodiments.

FIG. 3 depicts a lubrication distribution method 300 in accordance with one or more embodiments. The lubrication distribution method 300 is described with respect to FIG. 2. The lubrication distribution method 300 detects the piston stroke length and optimizes the control of the lubrication distribution assembly 200 independent of the dimensions of the lubrication metering device 201, such as piston cross section and different strokes lengths of piston 205. The lubrication distribution method 300 begins at block 320. At block 320, the lubrication distribution assembly 200 executes a training phase with respect to the piston 205 during at least two movement cycles of the piston 205. The training phase can be performed automatically at switching on of the sensor 210.

In the training phase, at block 322, the sensor 210 automatically detects a minimum distance and a maximum distance between the sensor 210 and the piston 205. The sensor 210 can detect the piston stroke length (e.g., the minimum and maximum distances) at predetermined intervals. For example, with respect to the predetermined intervals, the sensor 210 can detect the piston stroke length every ten movements for at least two movement cycles. A movement is a single directional translation by the piston 205 from a first position, such as a minimum distance (first end point), to a second position, such as a maximum distance (second end point), while a cycle is two movements that cause the piston 205 to move from and then return to the first position (e.g., one movement cycle includes an up-stroke and a down-stroke of the piston 205). Depending on a demand, the predetermined interval can be decreased or increased by the controller 210. Further, the sensor 210 can detect the piston stroke length for more than two movement cycles of the piston 205, e.g., at least three. In case where the piston stroke length strongly differs from one movement cycle to the next, the number of detected movement cycles can be increased for balancing these fluctuations.

As shown by block 322, the minimum and maximum distances are continuously communicated to the controller 204 by the sensor 210. At block 326, the controller 204 determines a piston stroke length based on the minimum and maximum distances (for each of the at least two movement cycles of the piston 205).

At block 360, the sensor 210 executes a relearning phase. For instance, the sensor 210 performs further detections of the piston stroke length, and, if required, relearns. The relearning phase can be performed continuously or in preset intervals. In accordance with one or more embodiments, due to the relearning phase, any influence of an external electromagnetic interference during usage of the (magnetic) sensor 210 can be reduced. Such magnetic interferences can result from, e.g., a presence of a magnetic field based on static charge or from disturbances in the vicinity.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a lubrication distribution assembly, a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified herein.

The flowcharts and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A lubrication distribution assembly comprising:
a lubrication metering device comprising a piston,
a sensor automatically detecting a piston stroke length of the piston over at least two movement cycles of the piston, and
a controller receiving the piston stroke length from the sensor, setting an operating point of the piston based on the piston stroke length, and controlling the lubrication metering device by utilizing the set operating point,
wherein the controller determines an average piston stroke length for setting the operating point of the piston.

2. The lubrication distribution assembly according to claim 1, wherein the controller sets the operating point of the piston based on the at least two detected instances of the piston stroke length.

3. The lubrication distribution assembly according to claim 1, wherein the sensor detects the piston stroke length at predetermined intervals.

4. The lubrication distribution assembly according to claim 1, wherein the controller sets the operating point at predetermined intervals.

5. The lubrication distribution assembly according to claim 1, wherein the sensor is a proximity switch.

6. The lubrication distribution assembly according to a claim 5, wherein the proximity switch comprises an inductive sensor, a capacitive sensor, or a magnetic field sensor.

7. The lubrication distribution assembly according to claim 5, wherein the sensor detects a minimum distance to the sensor and a maximum distance to the sensor during one piston stroke.

8. The lubrication distribution assembly according to claim 1, wherein the controller sets the operating point of the piston to a predetermined portion along the piston stroke length.

9. The lubrication distribution assembly according to claim 1, wherein the lubrication distribution assembly comprises an adapter unit that connects to the piston and the sensor.

10. The lubrication distribution assembly according to claim 9, wherein the lubrication distribution assembly comprises a sleeve in which the sensor and the adapter unit are arranged.

* * * * *